Patented June 16, 1931

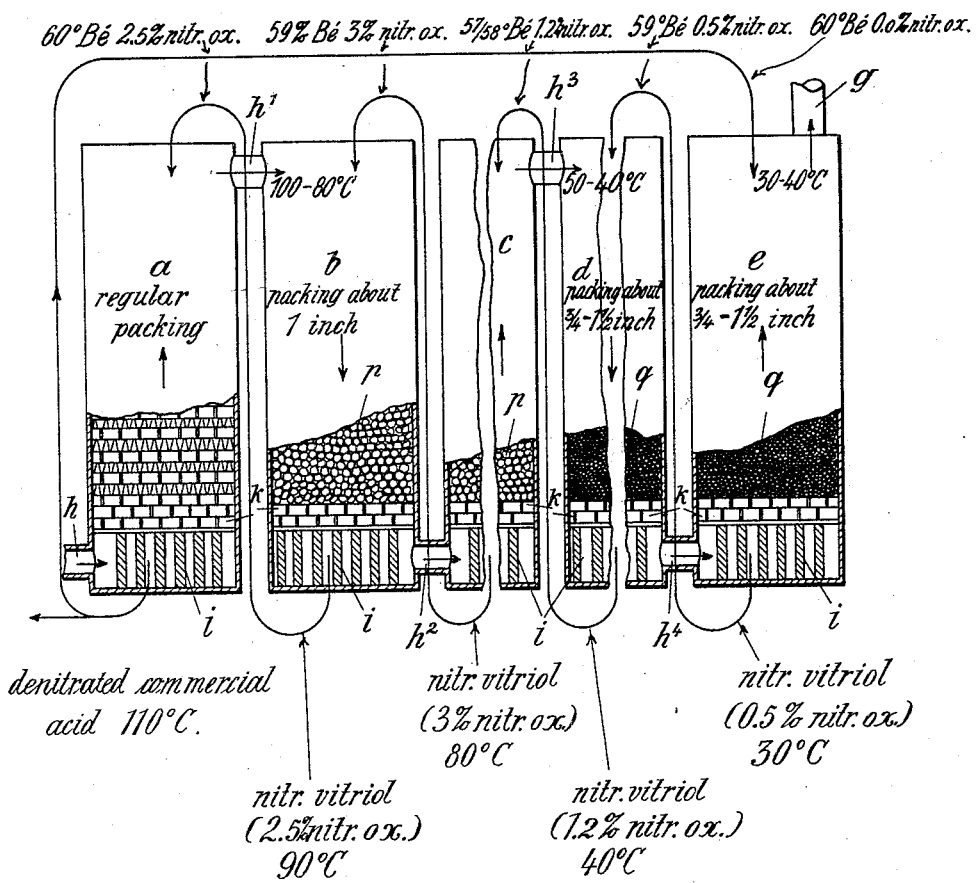

1,810,253

UNITED STATES PATENT OFFICE

HUGO PETERSEN, OF BERLIN-STEGLITZ, GERMANY

MANUFACTURE OF SULPHURIC ACID

Application filed May 5, 1925, Serial No. 28,126, and in Germany March 13, 1923.

I have filed applications in Germany, March 13, 1923, serial P. 45903 IV/12i; in Germany, April 27, 1923, serial P. 46154 IV/12i; in Germany, November 12, 1923, serial P. 47090 IV/12i; in Germany, March 10, 1924, serial P. 47672 IV/12i; in Germany, April 1, 1924, serial P. 47824 IV/12i; in Germany, April 24, 1924, serial P. 47966 IV/12i; in Germany, December 16, 1924, serial P. 49338 IV/12i; in Poland, January 26, 1924, serial P. 13424/u. P. 731/24; in Great Britain, December 29, 1924, serial 31118/1924; in Great Britain, March 26, 1925, serial 8130/1925; in Spain, January 17, 1925, serial 15121; in Spain, March 31, 1925, serial 15316; in Italy, April 2, 1925, serial 333/863; in Czechoslovakia, March 26, 1925; in the Netherlands, (Holland) March 10, 1925, serial 29592; in the Netherlands, (Holland) December 30, 1924, serial 28930; in Belgium, December 24, 1924, serial 256575; in Belgium, March 10, 1925, serial 257836; in France, March 10, 1925, serial 819.

This invention has reference to the manufacture of sulphuric acid by means of oxides of nitrogen, and it refers in particular to means of increasing the efficiency of the so-called nitro-sulphonic and nitrosyl sulphuric acid commonly called nitrous vitriol which is employed as a vehicle for the action of the oxides of nitrogen upon the gases of sulphurous acid or of sulphur-dioxide, and it is one of the important objects of this invention to so increase the reactivity of this compound that the formation of sulphuric acid may be chiefly brought about by this compound instead of by gaseous oxides of nitrogen, as heretofore generally practised. The increase of reactivity or of intensity of the action of the nitro-sulphonic acid according to this invention which may be produced both by the repeated acton of comparatively strong solutions of this compound upon the gases of sulphurous acid, as well as, on the other hand, by the greatly increased contact of the nitro-sulphonic acid and of the oxides of nitrogen either produced by its decomposition or present in the reaction chambers, may be such that practically the use of the usual so-called lead-chambers may be entirely dispensed with. In the practice of my invention in view of the desirability of a very great increase in contact surface and of so conducting the reaction that the gaseous and liquid reagents may repeatedly act upon each other artificial resistances of comparatively great compactness are employed, together with a regulation of the strength of the rinsing liquors and of the velocity of the gases, preferably by either using packing or filling bodies of comparatively very small size, as compared with those heretofore in use for the filling of the reaction chambers or enclosures, or by mounting the ordinary packing bodies or blocks more closely spaced than heretofore, so that the resistances produced will have to be overcome by an increase of movement, or of velocity of the gases, which effect may be produced by means of fans, exhausters, ventilators or the like. In further pursuance of my invention I may provide for the grading of the packing or filling of the reaction enclosures in accordance with the intensity of the reaction, and in view thereof a coarser packing may be used for denitrating purposes than for absorption purposes which as a rule takes place more slowly. My invention further comprises a particular form and configuration and arrangement of reaction chambers or other enclosures in which the reaction is carried on by the aid of the packing or filling referred to, such enclosures in one embodiment of my invention being given a broad shape of considerably increased diameter, so that the gases in view of the resistance offered to their passage in the vertical direction will be compelled to spread laterally and to occupy the entire cross sectional area of such reaction enclosures. Inasmuch as it is of importance to produce a thorough reaction by the repeated revolving, so to speak, of the reacting molecules, it will sometimes be of advantage in the practice of my invention to produce the quantities of acid intended for sale or for other outside uses, and constituting the output of the plant, in separate reaction enclosures, towers or the like, where a thorough denitration of the product obtained by the revolving action referred to may be effected by the fresh sulphurous gases and by water. By acting in this manner highly satisfactory results are obtained with gases of rather low or greatly changing contents of sulphur-dioxide, and it also becomes possible to consume and thoroughly convert into sulphuric acid the last traces of sulphur-dioxid contained in sulphur gases, furnace gases and the like which it was very difficult to deal with in accordance with the previous methods and operating apparatus. These and other important advantages will appear as the specification proceeds and from an inspection of the drawing.

On the accompanying drawing forming part of this specification I have shown by way of exemplification only and diagrammatically a combination of enclosures, chambers or towers, or boxes with packing or filling means, suitable for the purposes of my invention constituting a sulphuric acid plant provided with different kinds of packing. In accordance with the method of my invention which is based upon the increased or more intensified reactivity of the nitrosulphonic acid and nitrosyl-sulphuric acid the contents or the strength of nitrosulphonic acid may be so increased that it will act as a carrier of nitrogen-oxides and thereby become a great oxidizer for the sulphur-dioxid of the sulphur-gases. In both cases the efficiency of the nitrosulphonic acid upon which the so-called lead-chamber process is usually assumed to depend, is vastly increased, and this result may be accomplished or aided to a great extent by the increase of the velocity of the gases and the comparative compactness of the filling or packing of the containers, enclosures or the like.

As the rinsing acid I may use solutions of nitrosulphonic acid or nitrous vitriol in high grade sulphuric acid, and as an exemplification this solution may be obtained by dissolving chamber-crystals in high-grade sulphuric acid and under such conditions of temperature and concentration that decomposition of the solution does not take place by such dissolving action and during the rinsing of the reaction spaces. No denitration is effected during the production of sulphuric acid itself by the use of this solution as an oxidizing agent for the sulphur-dioxid, the reaction and oxidation going on in the liquid itself, which clearly differentiates this invention from prior proposals in which in mixing concentrations approximating 60° Bé. were to be usually obtained by an increase of temperature, a fact which is well-known to experts to be one of the best means of denitration. This substantially copious evolution of nitrous gases in the production spaces and the rise of temperature are avoided by proceeding in accordance with my invention. In my process only that portion of the finished sulphuric acid which is intended to go to the market, is denitrated in any well known manner in a special space, and this denitration evidently does not constitute a part of my invention. By preparing the rinsing acid for the acid-production spaces in the manner referred to and using it in said production spaces it has been ascertained that the strength of the acid will then rise to 66 degrs. Bé. at 15° centigrade with a content of nitrosulphonic acid up to 35%, calculated on nitric acid of 36 degrs. Bé. This content under some conditions may even still be further increased. The denitration of the acid may be effected only for the purpose of producing the acid for the market or for other uses, where low content of or substantial freedom from nitrogen is desired.

It is one of the important advantages of this method of procedure that sulphuric acid of great strength is obtained which is adapted to more readily absorb nitrous compounds than the usual chamber or tower-acid of 55 to 60 degrees Bé. strength. In further pursuance of my invention it has been ascertained that these solutions of nitrosulphonic acid in high-grade sulphuric acid may be made to act repeatedly upon the sulphurous acid gases without any liberation of nitrogen oxides taking place which behavior differs considerably from that of solutions of nitrosulphonic acid in weaker grades of sulphuric acid; in these solutions the oxides of nitrogent are immediately liberated by the reaction with sulphur-dioxid and in consequence thereof can be used only once. With a sulphuric acid plant of ordinary arrangement and employing as an instance hot gases of $SO_2$ and containing about 6 to 7% per volume of sulphur dioxide one may use for instance a tower or the like into which the fresh gases or only a portion thereof are caused to enter and which is rinsed in the usual manner for the production of this marketable acid only which is to be substantially denitrated and concentrated. In the case of larger plants possessing for instance four Glover-towers disposed in parallel, two of such towers whenever required may be used for this purpose of producing marketable acid. All the other reaction spaces in the case above referred to are fed with nitrosulphonic acid of such amount and of such strength that the acid discharged will still contain very great quantities of nitro-sulphonic acid the degree of which must be so adjusted that there will be the least possible liberation of gas in the escaping acid. It has been ascertained in the practical operation of the process that this prevention of the liberation of gas will already be acccomplished if the discharged liquid will still contain 0.5% of nitro-sulphonic acid, as expressed in nitric acid of 36° Bé. However, far more favorable results are obtained with a larger content of nitro-sulphonic acid in the discharged acid, thus for instance with a content above 2%. The percentage may be so increased as to amount to about 5/6 of the initial percentage of nitro-sulphonic acid. In some cases the total initial contents of nitro-sulphonic acid remains unchanged and sometimes the percentage thereof in the escaping acid may even be increased, which is due to the fact that the reaction space, tower or the like has already received a certain amount of oxides of nitrogen from the sulphur gases fed thereto, so that it will operate in part as a Gay-Lussac-space.

In further pursuance of this procedure of maintaining a supply of nitro-sulphonic acid in the reaction spaces it will be preferable to cause the entire nitrosulphonic acid from Gay-Lussac section to be acted upon by the gases as far as possible at the front portion of the system with the result that the oxides of nitrogen which are liberated in this comparatively hot Gay-Lussac zone of the system will be compelled to pass through a comparatively long reaction passage and will thereby greatly contribute to the formation of sulphuric acid. It has been ascertained to produce particularly favorable results in the operation of the process if gaseous oxides of nitrogen are caused to react upon the sulphurous acid simultaneously with the oxides of nitrogen contained in the nitro-sulphonic acid.

When acting in this manner, it is easy to overcome the difficulties heretofore experienced in the working up of the last remnants of $SO_2$ particularly in the case of gases with considerable variation in the contents of $SO_2$.

As a general working rule of this part of the process in which operating acids of very high strength and consequently with only slight admission of water are employed such an amount of nitro-sulphonic acid has been found to produce favorable results that its contents of oxides of nitrogen calculated on nitric acid will amount to a multiple of the $SO_2$ entering the system. The proportion may be so increased that the oxides of nitrogen amount to six times or more of the amount of $SO_2$ existing, and as a practical instance a nitro-sulphonic acid of 8% and above may be used.

The degree of density of the nitro-sulphonic acid employed may vary, and for practical purposes a strength of 55 to 60 degrs. Bé. or even 66 degrs. may be used.

As an example of a preferred way of arranging the different reaction chambers I may refer to an exemplification of a system of apparatus comprising as an instance four towers. Of these the first tower would correspond to the ordinary Glover-tower, and it is rinsed from the third and fourth towers, this latter fourth tower functioning as a kind of Gay-Lussac-tower and which may be rinsed with acid of 60 degrees Bé. or more, while the third tower receives an acid of, say 55 to 57 degrees Bé. This third tower besides being utilized for the production of the nitro-sulphonic-solution will also serve to retain any remnants of $SO_2$ which might have passed through the second tower. This second tower in which the gas is preferably caused to flow in the downward direction, may be rinsed with sulphuric acid of 60 degrees Bé. In this second tower the solid chamber-crystals are formed which will be dissolved in the strong sulphuric acid. The formation of these chamber crystals takes place in presence of the limited quantities of water introduced from the first tower, and whenever necessary some additional water may be introduced, sufficient to insure the formation of these crystals, but insufficient to produce decomposition thereof. Instead of but one tower being used for each stage a plurality of towers may be employed in the various stages, nor am I restricted to the particular concentration of the acids herein stated by way of exemplification only.

As an exemplification of means for bringing about the intimate contact and free distribution of the reagents I have shown in the drawing diagrammatically and by way of exemplification tower-like reaction chambers $a$, $b$, $c$, $d$, $e$ with different kinds of packing. The gases are supposed to pass through the conduits $h$, $h^1$, $h^2$, $h^3$, $h^4$ and to escape at $g$. The packing or filling is supposed to be arranged in the usual manner upon blocks or the like $i$ of grate-shaped or any other well-known and preferred arrangement. In accordance with this feature of my invention the gases are caused to pass either in the upward or downward vertical direction through the different chambers which are packed in such a manner that comparatively considerable resistances to the passage of the gases are created in the chambers. This object may either be accomplished by using plates or the like $m$ with many perforations or packing blocks $k$ which are more closely spaced than usually or the individual packing bodies are given such a degree of fineness that they present great obstacles to the free passage of the gases. In order to overcome these resistances, an exhauster, fan or the like, not shown in the drawing, is arranged at any suitable point of the system which the gases and at the same time produces a whirling around and atomizing of the thin film or layer of liquid on the surface of the packing or of the plates, blocks or the like and imparts to them and to the gases in the particular enclosure a very violent movement in view of the fact that the pressure employed is considerably in excess of the pressure required to overcome the internal resistances of the system. The filling or packing should of course consist of perfectly acid-proof material and the reagents gases and liquids may be conducted through and in contact with the packing in the same or in counter-current direction.

The required very fine distribution of the reagents is further facilitated by a very high degree of subdivision or granular distribution or compactness of the packing or filling bodies employed for the production of the artificial resistances. The subdivision of the packing must be considerably below the size of packing or filling bodies heretofore used in reaction towers. As heretofore practised, such packing bodies of regular or irregular shape were of a size to be measured by inches or centimeters, while for the purposes of this invention the size of the packing or filling bodies to be employed should preferably be such that their diameters amount to but fractions of an inch or even of one centimeter. In connection therewith it is of advantage to so distribute the packing that those parts of the system of apparatus adapted for the denitration or Glover-section of the plant are filled with somewhat larger pieces of packing as indicated at $p$ in the drawing as compared with those parts serving for the absorption and for which packing material $q$ of smaller size is used, inasmuch as the denitration takes place at a considerably quicker rate than the absorption. For the packing of those parts of the system intended for the reduction and denitration pieces of about walnut-size (say about 3 centimeters or about one inch) are preferably employed, while for the filling of the absorption containers the granulation should be as low as 1 to 10 millimeters (0.04 to 0.4 inches). Both these kinds of granulation, including the walnut size, differ very considerably from the sizes of granulation heretofore employed in connection with reaction towers. The packing or filling may be placed on a bedding or foundation of blocks, plates or other bodies $i$, $k$, so as to allow of the admission of gases and of the discharge of liquid.

In view of the fineness of granulation of the packing the cross-sectional sizes and heights of the reaction spaces heretofore employed may be changed, in order to avoid producing too high resistances which might interfere with the movement of the gases. The height of the containers according to my invention may therefore be less and the diameter may be larger than heretofore, and in accordance with the quantities of gases to be handled and in view of the fine granulation of the material of the packing, the ratio of the dimensions may be such that the diameter is greater than the height.

In some cases, it may be advisable to employ resistance bodies or packing presenting less obstructions than in the form of execution above mentioned, and a somewhat coarser granulation than has been mentioned with reference to the packing material referred to; but this granulation should still be smaller than the size of filling and packing material heretofore ordinarily employed for towers of the usual size.

While the kind of packing reaction spaces described and the particular kind of reaction containers of reduced type will produce particularly favorable results in connection with the employment of strong nitro-sulphonic acid as a means of converting the $SO_2$ of the sulphurous acid gases into sulphuric acid, the packing may also be employed with advantage in connection with working acids containing smaller percentages of nitro-sulphonic acid, such acids running all the way from approximately 54 to 60° Bé. and adapted to be denitrated in the usual manner. This strength of acid is equally well adapted to absorb nitric oxides when submitted to the action of the artificial resistances according to this invention.

In further pursuance of this part of my invention, it has been found to be of advantage to use such acids particularly at the entering and the exit portions of the system of apparatus.

The reaction produced in this manner may be further assisted by arranging a reaction chamber filled with any kind of packing or filling material and in any desired manner between the denitrification and absorption portions of the plant, and in such intermediate reaction chamber the formation of sulphuric acid is to take place substantially by the action of gaseous nitrogen oxides upon the sulphurous acid. This intermediate chamber which, if desired, may be composed of several sections is either rinsed or not rinsed. In case of its being rinsed, this may be done with acid of different strength or even with water. A sulphuric acid of 63° Bé. strength which may be produced in the operation of the plant itself, has likewise proved to be suitable for the purpose. It has been found to be of great advantage to cause the gases to pass through this reaction space in the downward direction: with this kind of flow of gases they are compelled to become distributed over the entire sectional area of the container. This intermediate reaction space does not require such small-sized filling or packing bodies or so finely comminuted packing material as the principal parts of the system above referred to, or any such close setting of blocks or plates as would create appreciable resistance, as required for those principal parts of the system.

In accordance with my invention I am also enabled to avoid the necessity of using unduly large amounts of lead, as required by some of the processes heretofore suggested for the production of sulphuric acid by means of oxides of nitrogen, but without the usual lead chambers, the cost of the lead for the small lead containers used in some of these processes amounting to more than the cost of ordinary lead chambers and of other parts of the chamber system combined. My invention also does away with the use of spraying rollers and the like as heretofore suggested and which, besides necessitating a large expenditure of operating power, are liable to produce the eating away of the lead of the containers in view of the increase of reaction.

While I have described my invention with particular reference to some preferred embodiments, it should be understood that it is not limited thereto, but it is susceptible of alterations and modifications in accordance with local and other requirements and without deviating from the scope and spirit of the invention, as defined in the appended claims.

I claim:—

1. In the manufacture of sulphuric acid by the chamber method, treating sulphur-dioxid gases with strong sulphuric acid liquors containing nitrogen oxids and in presence of oxygen, absorbing the gases in the liquid in the presence of finely granular packing bodies, substantially not exceeding four-tenths inches in diameter, denitrating a certain portion of the liquid produced in the presence of granular packing bodies, substantially not exceeding one inch in diameter, and producing a vigorous movement of the gases of reaction.

2. In the manufacture of sulphuric acid by the chamber method treating sulphur-dioxid gases with strong sulphuric acid liquors containing nitrogen oxids and in presence of oxygen, denitrating a portion of the liquor produced in the presence of granular packing bodies, substantially not exceeding individually one inch in diameter, absorbing the gases produced by the action of sulphur-dioxid in sulphuric-acid-liquor in the presence of granular packing bodies, substantially not exceeding four-tenths of an inch each in diameter, and passing the gases between the denitrating and absorbing stages in presence of packing bodies of a size exceeding one inch in diameter.

3. In an apparatus for the manufacture of sulphuric acid by the chamber method the combination with a plurality of relatively broad inter-communicating reaction chambers, and gas-admitting and liquid-admitting means on said chambers, of granular packing bodies of substantially one inch size in certain of said chambers adapted for denitration, and granular packing bodies, substantially not exceeding four-tenths of an inch size in others of said chambers, adapted for absorption purposes.

4. The manufacture of sulphuric acid by the chamber method, which consists in treating sulphur-dioxid-gases with strong nitrosulphonic-acid liquor of a strength ranging in density from about fifty-five to about sixty-six degrees Beaumé in the presence of acid-proof finely divided distributing material, comprising granular packing bodies having individual grains ranging from about four-tenths of an inch diameter to about one inch diameter, and under such conditions, as to substantially prevent denitration of the liquor during the treatment, thereby oxidizing the sulphur-dioxid into sulphuric acid, substantially maintaining at least the original percentage of nitrosulphonic acid in the resulting mixed acid liquor, withdrawing a certain portion of said liquor and denitrating said portion.

HUGO PETERSEN.